L. S. HACKNEY.
ORANGE AND LEMON SQUEEZER.
APPLICATION FILED DEC. 26, 1908.
968,344.
Patented Aug. 23, 1910.
2 SHEETS—SHEET 2.
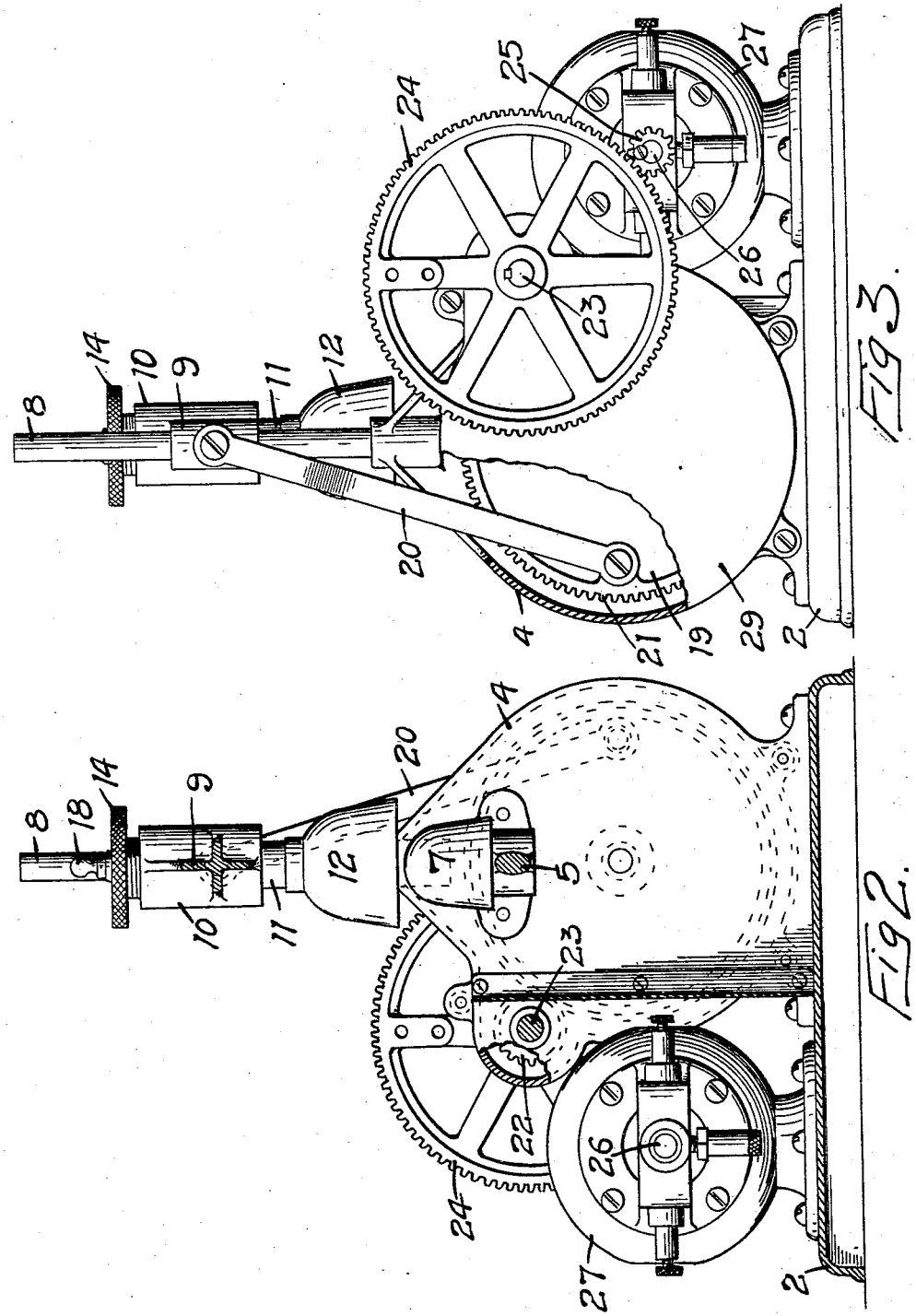
WITNESSES
INVENTOR
LESLIE S. HACKNEY
BY Paul & Paul
HIS ATTORNEYS

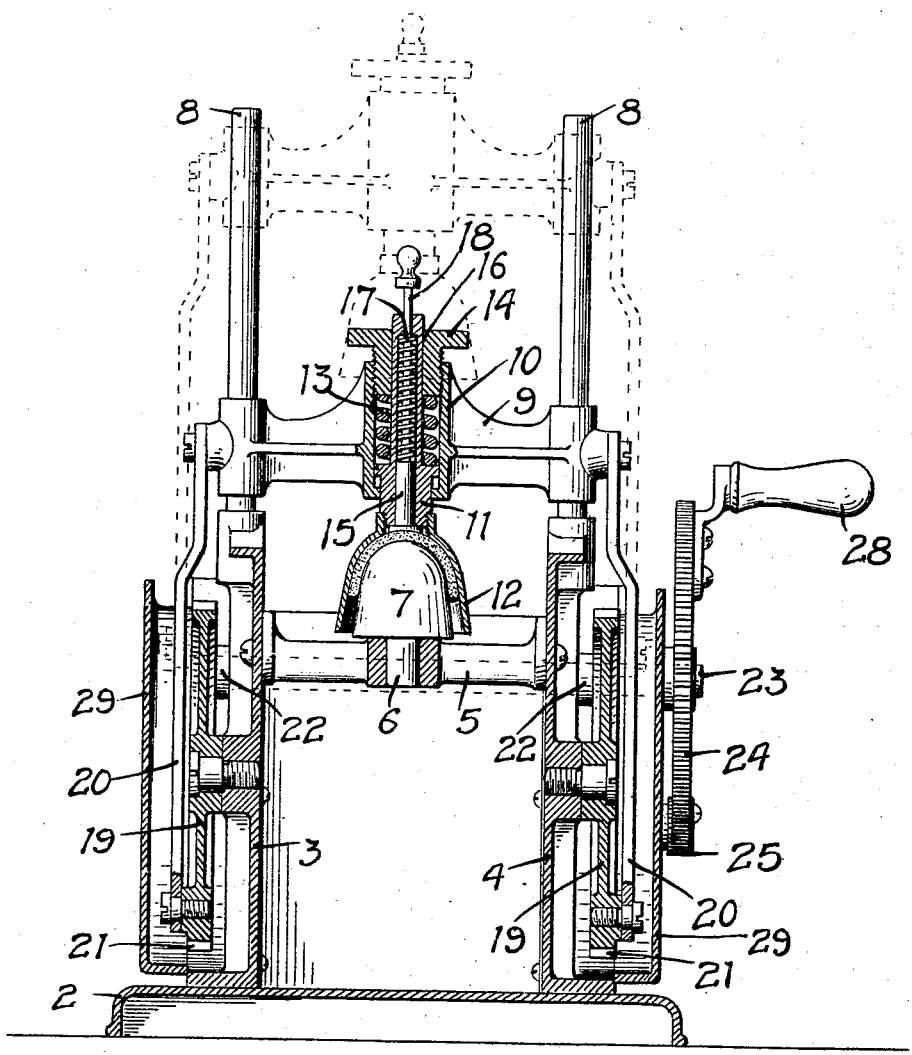

UNITED STATES PATENT OFFICE.

LESLIE S. HACKNEY, OF ST. PAUL, MINNESOTA.

ORANGE AND LEMON SQUEEZER.

968,344.  Specification of Letters Patent.   Patented Aug. 23, 1910.

Application filed December 26, 1908. Serial No. 469,414.

*To all whom it may concern:*

Be it known that I, LESLIE S. HACKNEY, of St. Paul, Ramsey county, Minnesota, have invented certain new and useful Improvements in Orange and Lemon Squeezers, of which the following is a specification.

The object of my invention is to provide a machine of simple, durable construction, by means of which a lemon or orange, split in two pieces, may be easily and quickly squeezed and the juice extracted for drinking purposes.

A further object is to provide a machine adapted particularly for counter use in drug stores, saloons, fruit stands and places on the street where orange juice and lemonade are dispensed.

My invention consists generally in various constructions and combinations, all as hereinafter described and particularly pointed out in the claims.

In the accompanying drawings, forming part of this specification, Figure 1 is a vertical, sectional view of an orange and lemon squeezer embodying my invention, Fig. 2 is a similar view taken on a section line substantially at right angles to the section line of Fig. 1, Fig. 3 is a side elevation of the machine.

In the drawing, 2 represents a suitable base adapted to rest upon a counter or other support and on said base, standards 3 and 4 are mounted.

5 is a cross bar supported by the standards 3 and 4 and adapted to receive the lower portion 6 of the stationary part 7 of the squeezer. This part is in the form of an inverted cup, made of glass or other suitable material and having a corrugated surface similar to the squeezers now in general use and capable of removal from the supporting cross bar to allow the substitution of another part of different size, according to the size of the fruit that is to be squeezed.

Upon the standards 3 and 4 are upright guide rods 8 whereon a cross head 9 is vertically slidable. A cylinder 10 is provided in this cross head having a piston 11 that is adapted to slide in said cylinder and carries the upper or movable portion of the squeezer 12 on its lower end. This movable portion is also cup-shaped and of sufficient size to fit down over the part 7 and press on the section of fruit placed between the two parts of the squeezer. A spring 13 is provided in the cylinder 10 above the piston 11 and is adapted to yield sufficiently to allow the cup 12 to accommodate itself to the varying thicknesses of the sections of fruit and their resistance to the squeezing operation. The tension of this spring is regulated by a plug 14.

An ejector 15 is provided within a chamber 16 in the piston and is normally held in contact with the surface of the fruit by a spring 17. This ejector has a stem 18 projecting through the plug 14. By means of this ejector, the rind and the squeezed section of fruit can be easily and quickly discharged from the cup when the squeezing operation has been completed.

For the purpose of imparting a vertical movement to the cross head I provide crank disks 19 journaled on the standards 3 and 4 and have pitman rods 20 pivotally connecting the crank disks with the ends of the cross head 9. The crank disks have gears 21 on their periphery meshing with pinions 22 on the shaft 23, said shaft carrying a large gear wheel 24 which meshes with the pinion 25 on a shaft 26 of a motor 27. An operating handle 28 is mounted on the gear 24, which may be removed whenever it is desired to drive the mechanism through the motor. The motor has suitable terminals for attachment with electric conductors and I am thus able to operate the machine by means of the operating handle or by power. The connections with the crank disks are so arranged that the pitman rods will be passing the center of the disks during the squeezing operation and at that time, the greatest power will be applied to the stationary portion of the squeezer and the juice of the fruit section resting thereon will be quickly and thoroughly squeezed out.

Beneath the stationary portion of the squeezer I provide an unobstructed space wherein a cup or other suitable receptacle may be placed to receive the juice.

It will be noted that the walls of the movable portion of the squeezer extend a considerable distance below the section of fruit, thus preventing the escape of the juice through the sides and directing it downwardly into the receptacle beneath. Suitable shields 29 are provided in each side of the machine and inclosing the crank disks and the pitman rods and covering to a considerable extent the operating mechanism of the machine.

This device may be made in different sizes and is designed as an inexpensive apparatus, by means of which the fruit juices may be extracted easily and quickly and without waste.

I claim as my invention:

1. A device of the class described, comprising a base and standards mounted thereon, guide rods carried by said standards, a cross head vertically slidable on said guide rods, means for reciprocating said cross head, a stationary cap arranged between said standards, a cup carried by said cross head and adapted to receive said cap when said cross head is depressed, and a spring device provided in said cross head above said cup and yieldingly resisting upward movement of the same.

2. The combination, with the upright standards, of a cone shaped cap supported between them, guide rods mounted on said standards, a crosshead vertically movable on said guide rods, a cup carried by said crosshead, means mounted in said crosshead for yieldingly resisting the upward movement of said cup and means for reciprocating said crosshead, substantially as described.

3. In a machine of the class described, the combination, with a vertically reciprocating crosshead and a cylinder provided therein, of a piston slidable in said cylinder, a cup carried by said piston, a plug provided in the upper end of said cylinder, a coiled spring interposed between said plug and piston, and a cap supported below said cup and having a conical outer surface and adapted to enter said cup when said crosshead is depressed and means for actuating said crosshead.

4. The combination, with the upright guide rods, of a cap supported between them, a crosshead vertically slidable on said guide rods, a plunger arranged to slide on said crosshead, a cup carried thereby and arranged to receive said cap and means for reciprocating said crosshead.

5. A device of the class described, comprising a suitable base, standards thereon having guides, a cross head vertically movable on said guides, a stationary cap, a cup carried by said cross head and arranged to inclose said cap, crank disks journaled on said standards, pitman rods connecting said crank disks with said cross head and driving means for said crank disks.

6. A machine of the class described, comprising a stationary cap and a support therefor, a vertically moving cross head having guides and means for operating said cross head, a cylinder provided in said cross head, a piston therein, a cup carried by said piston and arranged to inclose said cap, a spring for normally holding said piston in a depressed position, and means for regulating the tension of said spring.

7. The combination, with a frame, of a reciprocating cross head or bar, and means for operating the same, a cup carried by said cross head, means yieldingly resisting the upward movement of said cup, and means for regulating the degree of such resistance and a fixed cap between which and said cup the fruit is squeezed.

8. The combination, with a frame, of a sliding cross head and means for operating the same, a cup yieldingly supported by said cross head and a stationary fruit support between which and said cup the fruit is squeezed.

9. A machine of the class described comprising a frame, a fruit support carried thereby, a space being provided beneath said support to receive a glass or other receptacle, a cross head arranged to slide vertically above said support, a cup, a piston or plunger yieldingly supported in said cross head and whereon said cup is mounted, and means for reciprocating said cross head.

In witness whereof, I have hereunto set my hand this 8 day of Dec. 1908.

LESLIE S. HACKNEY.

Witnesses:
W. L. HACKNEY,
LOUIS JOHNSON.